United States Patent Office 3,400,096
Patented Sept. 3, 1968

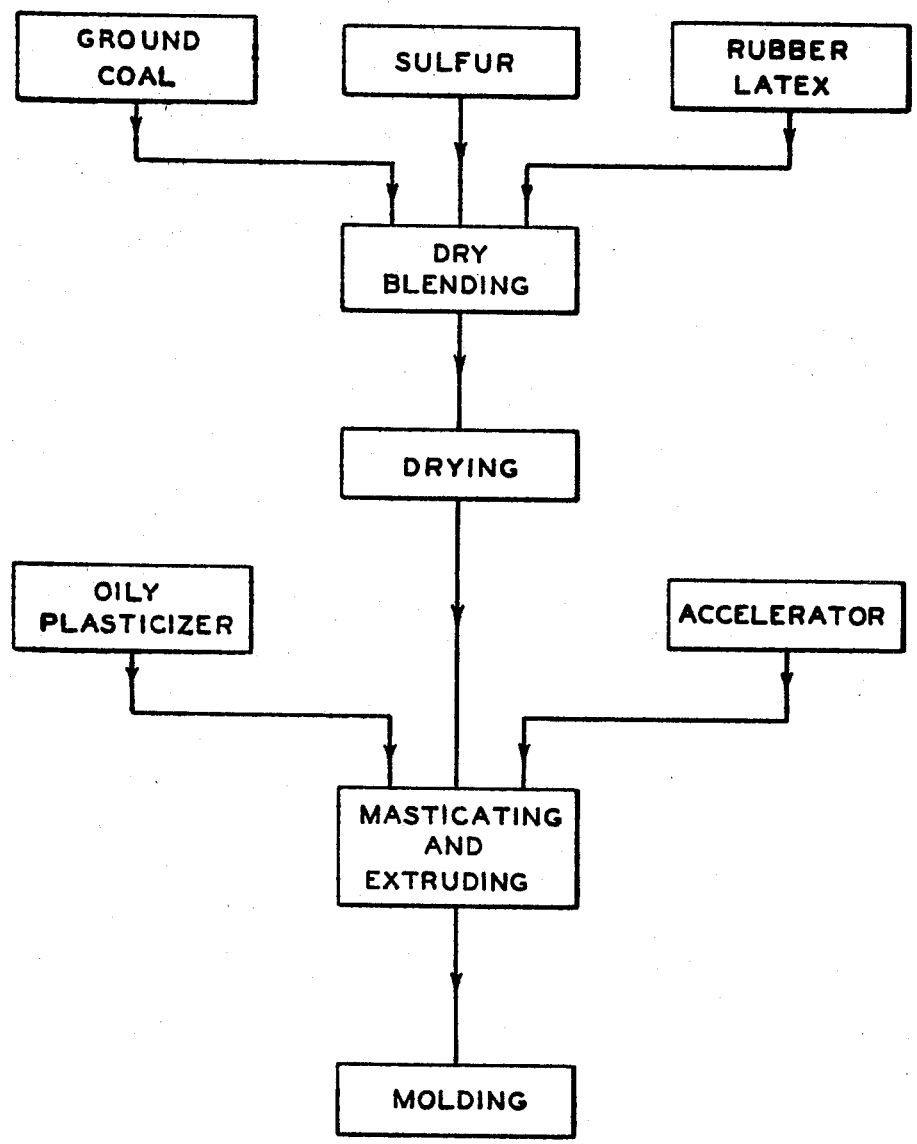

3,400,096
PROCESS OF MAKING COMPOSITIONS USEFUL FOR HARD RUBBER PRODUCTS
Richard M. Bateman, Erie, Pa., and Michael K. Parrent, Welland, Ontario, Canada, assignors to The General Tire & Rubber Company, Akron, Ohio, a corporation of Ohio
Continuation-in-part of application Ser. No. 759,164, Sept. 5, 1958. This application Dec. 30, 1963, Ser. No. 337,700
9 Claims. (Cl. 260—33.6)

This application is a continuation-in-part of our prior copending application Ser. No. 759,164, filed Sept. 5, 1958, and entitled, "Process of Making Hard Rubber Directly From Latex," now abandoned.

This invention relates to a process for making and molding highly loaded rubber compositions such as those used for making hard rubber storage battery containers.

In the manufacture of cured rubber articles such as battery boxes and other molded articles, it is desirable and indeed economically essential to have a highly accelerated or fast curing compound to reduce the time the compound in the curing mold, etc. However, much difficulty has been experienced heretofore with scorching of the rubber compounds when they are highly accelerated and when they are processed in the normal way by mass mixing of the rubber and its compounding agents. This is particularly the case when the percentage of rubber and plasticizer in the compound is extremely low as in the case of battery box compounds containing less than 25% of rubbery polymer. For example, in all conventional processing of rubber compounds, one inherent problem has been to control the amount of heat developed in processing to prevent premature vulcanization of the compound. It has been impossible to prevent scorching of the rubber due to the heat generated by use of a large amount of filler and a small amount of rubber. This has been overcome to a certain extent by the use of delayed action accelerators of vulcanization, omitting the incorporation of accelerators until the latest possible stage in the process, etc. Whilst these methods are generally satisfactory they are not entirely suitable for the processing of compounds having a low rubber hydrocarbon content or compounds designed to produce hard rubber products.

Additionally this control of heat development has been the major factor in preventing the development of a suitable method of continuously processing rubber compounds. A further difficulty in previous attempts to continuously mix rubber compounds has been to ensure a proper dispersion of all the ingredients in the receipe, this difficulty being aggravated by the widely differing natures of the ingredients (i.e., liquid, powdery, elastomeric, waxy, etc.). Also, it has often been proposed to mix rubber powders and fillers in a continuous manner using extrusion mixing means. Difficulty has always been experienced heretofore in such continuous mixing processes because of separation or stratification of compounding ingredients and rubber in the extruding means. This is particularly the case when the rubber content is low in proportion to fillers as in battery box compounds.

It is an object of the present invention to provide a method of preparing low rubber content compounds having exceptionally high curing speeds, as well as to provide a continuous process of mixing rubber compounds with virtually no heat history due to processing and having a very low rubber content.

It is another object of the invention to provide a process of producing compositions having a low rubber content without having separation or stratification of rubber and solid compounding ingredients such as fillers and for molding said compositions.

These and other objects will become apparent from the specification, claims and accompanying drawing which is a flow sheet illustrating a preferred method of making compositions suitable for molding into hard rubber articles of the present invention.

According to the present invention, a rubbery polymer is dispersed throughout substantially dry rubber compounding agents by adding a rubber latex or aqueous dispersion of rubber to the dry compounds and removing the water while agitating the powdery mass which is exposed to a stream of heated gas or air.

It is recognized that rubber compounds have been prepared by mixing slurries or dispersions of compounding agents directly into latex and coagulating, filtering and drying the mixture and masticating the dried coagulum wherein the rubber is present in a major amount. However, we are concerned with compounds wherein the amount of rubber is much less than the amount of filler.

We have found that the past heat history of highly accelerated low rubber content rubber compounds sets a limit on the acceleration permissible. If one can accomplish the entire mixing of the compounding agents while maintaining a relatively low temperature except for only very short periods of time, a highly accelerated compound can be used which can be cured very quickly and which prior to curing has a minimum heat history or a minimum of or no scorching.

In the present invention the latex (15 to 70% by weight of rubber solids in the latex) is suitably added to a tumbling mass of substantially dry fillers, preferably by spraying or otherwise contacting the mass with a stream of the latex. Distribution of the rubber throughout the powder or finely divided material is then obtained.

In accordance with the present invention we have found that the removal of water and the method of removing water are important elements of our process. Drying of latex moistened powders in tray driers has been unsuccessful, because surface portions become dried and heated more than deeper portions and partial curing of the small amount of rubber occurs rendering it ineffective as a binder during molding. By subjecting the latex treated solids to a stream of heated gas (such as that obtained by burning natural gas under oxidizing conditions) while the solids are agitated, we have found that the temperature of the latex treated solids remains very low, usually about 120° F. even though the gas temperature emitted is high, i.e., 400 or 450° F. until the moisture content of the solids mixture is about one percent of the mass. At about this point, the temperature starts to rise rapidly. Therefore by watching the temperature of the latex-treated solids, drying can be readily controlled so that the rubber does not vulcanize prematurely.

This invention is principally directed to a highly loaded rubber composition which can be continuously processed to obtain a uniformly dispersed mixture suitable for compression molding without premature vulcanization of the mixture and which is useful in making hard rubber storage battery containers. As seen in the drawing, a hard rubber composition can be processed by mixing a relatively small amount of rubber latex with a relatively large amount of filler (preferably powdered anthracite coal) and sulfur so as to obtain a continuous solid phase mixture, drying the mixture, further masticating and blending said mixture by shear action such as that provided by a tightly set two-roll mill, and thereafter shaping said mixture by using a forming method such as compression molding. As aforesaid, by using a small amount of latex, enough to wet the filler partially but not enough to destroy the solid phase of the mixture, we surprisingly obtain a uniformly dispersed mixture without the usual heat build-up and premature vulcanization of the mixture which greatly hinders subsequent molding and vulcanizing operations. Since in the process of the present invention the heat history (scorching) of the compound is kept to a minimum, compounds having a very high degree of acceleration may be processed, even enabling fast mold cures as short as 1½ minutes.

It is important that only small amounts of the rubber latex be continually added to the mixture along with the fillers and sulphur. Processing oils and other additives, also, may be added to the initial mixture although when the latex is of a very low solids content, liquids such as processing oils are preferably added in the blending step after the mixture has been dried as indicated in the accompanying drawing. It, also, is preferred that any organic accelerators used be added after the mixture is dried and before the molding operation.

The amount of rubber latex added to the filler can generally be varied substantially. However, when the amount of the plastic rubbery solids is appreciably less than 5% by weight of the total composition, there is insufficient rubber to bind the solids together to make a high impact material. When larger amounts, such as 8 or 10%, are used substantially higher impact is obtained and 8% to 15% is ordinarily used. The maximum amount which may be used depends on the surface area of the fillers as well as upon economic factors. The amount of latex in no case should be above that which still permits the formation of a granular mixture. Generally, in the case where most of the fillers are relatively coarse, up to 25 percent of the composition may be plastic rubber from latex.

Any aqueous dispersion of a vulcanizable polymer or copolymer may be used for part or all of the rubbery binding materials in the present invention. Examples of such materials are the polymers of one or more diolefinic compounds including conjugated diolefins such as butadiene, isoprene, dimethylbutadiene, as well as chloroprene and cyanoprene, all of which are characterized by having less than 8 aliphatic carbon atoms. These include copolymers of such diolefinic compounds with mono-olefins, such as styrene, acrylic and methacrylic esters including acrylonitrile, methylmethacrylate and the like. Generally the sulphur vulcanizable rubbers (such as natural rubber, reclaim rubbers, and diolefin-styrene copolymers, preferably GR–S rubber, a butadiene-1,3-styrene copolymers) which can be vulcanized to the hard rubber-like state are preferred for economical reasons. However, other vulcanizable rubbers, including butyl rubber and even the oil resistant rubbers such as the nitrile rubbers and cyanoprene polymers are suitable, particularly when oil resistance is desired.

It has been found that a low viscosity rubber (measured from the dry rubber) imparts excellent flow properties to the resultant compositions, particularly those used for making battery containers. Thus, for the best molding properties, a latex containing a rubber of low viscosity (as dry rubber, Raw Mooney viscosity of about 40 to 60, preferably 46 to 58 ML–4 at 212° F.) is preferably used. The only commercially available butadienestyrene copolymer latices that have a low viscosity (dry rubber) are those of low solids content.

The resultant mixture of filler, sulfur and rubber latex is one in which there is a continuous phase of solid particles, the amount of water in the latex being sufficient to only wet the particles. It has been found that formation of a paste-like mixture results in a loss of dispersion and creates difficult materials handling problems. Furthermore, the mixture should be dried to a moisture content of not substantially greater than about 2% by weight and for best results should be dried to at least about 1 percent. The temperature of the initial mixture (the latex treated solids) during the drying operation should be low enough to prevent any scorch or premature vulcanization of the mixture so that a range of from about 120 to 140° F. as a maximum temperature has been found satisfactory. More precisely, during the greater part of the drying operation, the temperature should be held below about 130° F. or preferably below about 120° F. However, when large amounts of curing agents are used for the hard rubber compositions and where sulfur or the organic accelerator or both are withheld from the initial filler-latex mixture, material temperatures as high as 250° F. can be reached during drying without scorching or prematurely vulcanizing the mixture. It has been found that the addition of the sulfur should be made prior to drying for best results, as after drying great difficulty is had with dispersion. Furthermore, when sulfur is added during or after the addition of oil, the properties are impaired.

While it has been stated that material temperatures during drying in some cases may be as high as about 250° F., nevertheless the temperature, as aforesaid, of the material during the greater part of the drying operation should be less than about 130° F. for at least three-fourths or preferably nine-tenths of the drying period. In accordance with the above, it is important that the temperature of the latex treated solids reach 200° F. or over for only very short times as damage to the polymer is likely even in a time as short as one minute. We prefer to closely observe the temperature of the material and remove it for cooling or otherwise cool the mixture when the temperature reaches about 200° F., after having been held at less than 130° F. during most of the drying operation.

Although fillers such as china clay, talc, diatomaceous earth, etc., can be used in whole or in part of the filler content of the rubber compositions of the present invention, the preferred filler for the best properties of strength, impact resistance and acid resistance for battery containers is powdered anthracite or semianthracite coal in a finely divided form. The powdered coal is generally used in amounts of about 500 to 1000 parts by weight per 100 parts of rubber (dry weight), while the preferred range is 700 to 900 parts for the best battery box compositions. The fillers should be finely divided, preferably about 80 mesh to 325 mesh U.S. screen.

The weight of sulphur used in the battery compositions of the present invention is preferably from about 10 to 40 parts by weight per 100 parts by dry weight of rubber, generally even the low sulphur content being sufficient to produce containers with satisfactory physical properties.

Accelerators in the weight range of 1 to 10 parts by weight per 100 parts dry weight of rubber are preferably used to accelerate the curing action of the sulphur. Suitable accelerators are the aldehyde-amine type such as the condensation product of butyraldehyde and aniline. Lime and zinc oxide are also suitable activators or accelerators although organic accelerators are generally preferred. As previously discussed, the accelerators are preferably added after the initial mixture of sulphur, filler and rubber latex has been mixed and dried.

Processing oils are also preferably added after the initial mixture of filler and rubber latex has been dried. It has been found that when these oil plasticizers are withheld from the initial preblend mixture, a much lower solids content latex may be used than is generally otherwise possible. The oily plasticizers, being liquid, apparently cut down on the amount of water tolerable in the initial filler-latex mixture.

Suitable oily plasticizers or softeners are liquid high molecular weight petroleum base oils such as Dutrex 6 and Sundex 53 which are compatible with the rubber.

The following are examples of various types of plasticizers showing identifying data, trade names, manufacturers and relative "heat loss" after exposing the oil for the time indicated at 300° F.

TABLE I

| Oil | Manufacturer or supplier | Pour point, °F. | Flash point, °F. | Aniline point, °F. | Boiling range, °F. | Heat loss at 300° F. | |
|---|---|---|---|---|---|---|---|
| | | | | | | 1 hr. | 3 hrs. |
| Sundex 53 | Sun Oil Co., highly aromatic content heavy process oil type with chemical unsaturation. | 70 | 380 | 130 | | 3 | 6 |
| Dutrex 6 | Shell Development, complex high mol. wt. aromatic and unsaturated hydrocarbons. No volatiles or asphaltic residue. | | | | +600 | 1 | 2 |
| Dutrex 7 | Shell Development, hydrocarbon plasticizer of heavy process oil type. | | 440 | | | 1 | 2 |
| Circosol 2XA | Sun Oil Co., hydrocarbons of high molecular weight derived from selected crude petroleum. Less aromatic than Sundex 53. | +10 | 430 | 181 | 700 | 1 | 3 |
| Indonex 637½ | Indoil Chemical Co., highly aromatic content, hydrocarbon plasticizer of heavy process oil type. | 55 | 515 | 115 | | | |

While any oily plasticizer or combination of oily plasticizers can be used, high boiling mineral oils free of strong polar groups such as acids are preferred. These oily plasticizers are usually used in the range of about 40 to 150 parts by weight based on 100 parts dry weight of rubber latex.

The following example illustrates the present invention and is not intended to limit it in any way:

Example

A hard rubber composition was made as explained below according to the following formula:

Ingredients— Parts by weight
Ground semianthracite coal (99% on 200 mesh U.S. screen) _____ 800
Sulphur _____ 20
Butadiene-styrene latex 20 to 25% total solids, raw Mooney viscosity of 52 (ML-4 at 212° F.), 22½–24½% bound styrene, SBR 1502 (dry weight) _____ 100
Petroleum base oil _____ 70
Aldehyde amines accelerator _____ 4
Primary fatty amine _____ 4

The powdered anthracite coal and sulphur were proportioned into a rotary blender, and the rubber latex was continually added to the dry blend so as to wet the solid particles and form a uniform dispersion rather than to form a liquid, pasty mixture at room temperature.

The blender continuously discharged a continuous solid phase mixture into a rotary drier in which the mixture was dried by passing gas through it to a moisture content of about 1 percent. The drying gas was the combustion product obtained by burning natural gas. The mixture was held at a temperature of about 120° F. during the drying operation. The oily plasticizer, aldehyde-amine accelerator and the primary fatty amine (preblended together) were then mixed into the dried mixture by means of a rotary blender. After the ingredients of the mixture were relatively uniformly dispersed the mixture was passed through a tightly set two-roll mill (water cooled rolls) to impart shear-action working to obtain ultimate dispersion and was subsequently extruded into relatively thick strips or preforms for subsequent molding operations. The preforms were converted into battery containers by compression molding for 4.5 minutes at 360° F.

Some of the unit operation may be combined and performed by one machine. In the above example, the masticating and extruding step may be performed by a working extruder or mill-extruder. In this type of working extruder, good dispersion is obtained by shear action. Also the drying, masticating, and extruding steps may be combined by using a machine designed to remove moisture from the material being mixed and extruded. The above steps may be advantageously combined particularly when the moisture content is kept to a minimum by the use of a relatively high solids latex, enabling the admixture of the oily plasticizer with the filler and latex mix from which none or only a portion of the moisture has been removed.

In the above example, the butadiene-styrene rubber latex may be substituted for by other rubber latices as previously discussed. Likewise, the powdered semianthracite coal filler, the accelerators and other compound ingredients may be substituted for by other rubber compounding ingredients as already discussed.

By the process of the present invention we are able to utilize lower proportions of rubber and lower plasticizer levels than were possible in the prior art in making hard rubber products. Normally in hard rubber compounds as the amount of a given rubber is reduced, the amount of plasticizer is increased (100 to 125 parts plasticizer on 100 parts of rubber). In the present invention, as the amount of a given rubber is reduced, the plasticizer level is not raised nearly as much. When the oil content is kept low, improved physical properties are achieved. Moreover, inasmuch as rubbers are always deteriorated to some degree by plasticizers, it is seen that the properties of the compounds of the present invention are therefore much superior to those of the prior art for the amount of rubbery polymer present.

What we claim is:

1. A process for making a composition having a minimum heat history and suitable for forming rigid articles such as battery boxes and the like comprising gradually adding an aqueous dispersion of a rubbery binder to relatively dry solid compounding agents comprising a filler selected from the group consisting of china clay, talc, diatomaceous earth, anthracite coal and semi-anthracite coal while said solid compounding agents are agitated to expose new surfaces to contact with said aqueous dispersion, the amount of said aqueous dispersion being insufficient to prevent formation of a granular product and the rubbery binder content thereof being from about 5 to 25% of the weight of the solids content of the latex treated solids, drying the resulting mixture while subjecting it to agitation in a stream of a heated gas, the temperature of the mixture being less than about 130° F. for at least three-fourths of the drying period, to a moisture content of less than 2% and removing the mixture from contact with the heated gas promptly before the temperature of the mixture reaches about 250° F. to avoid scorching said rubbery binder, said rubbery binder being essentially the only organic polymeric binder in said mixture and being a vulcanizable copolymer of butadiene-1,3 and styrene.

2. A process for forming hard rubber products in which rubber compounding ingredients are continuously mixed with an elastomeric binder into a homogenous completely dispersed state comprising the steps of forming a continuous solid phase mixture of a filler selected from the group consisting of china clay, talc, diatomaceous earth, anthracite coal and semianthracite coal, sulphur in an amount of from about 10 to 40 parts by weight per 100 parts by weight of said elastomeric binder, and from about 5 to 25 percent dry weight based on the weight of the mixture of a latex of an elastomeric binder and having a solids content of from 15 to 70 percent by weight, the amount of said latex being insufficient to prevent formation of a granular mixture, drying said mixture in a stream of a heated gas to a maximum moisture content of not substantially greater than 2 percent by weight while agitating the same, the temperature of the mixture being below about 120° F. during most of the drying period and the mixture being cooled when the temperature reaches 200° F., thereafter masticating said dried mixture with shearing action, and molding and vulcanizing said mixture to form a hard rubber article, said elastomeric binder being essentially the only organic polymeric binder in said mixture and being a vulcanizable rubbery butadiene-1,3-styrene copolymer.

3. A process for preparing compositions useful for compression molding and curing into hard rubber articles comprising the steps of forming a highly-loaded rubber composition containing a filler selected from the group consisting of china clay, talc, diatomaceous earth, anthracite coal and semianthracite coal and from about 5 to 25 percent (solids) by weight thereof a latex of a rubbery binder so that said composition is in a wettened condition and has a continuous solid phase, the amount of said latex being insufficient to prevent formation of a granular composition, drying said composition in a stream of a heated gas so that the maximum moisture content is less than about 2 percent by weight while agitating the same, the maximum temperature of said composition being from about 120 to 140° F. during the drying period, and further masticating said composition and blending therewith an oily petroleum hydrocarbon plasticizer to form a relatively homogenous blend for compression molding and curing, said rubbery binder being essentially the only organic polymeric binder in said composition and being a vulcanizable rubbery butadiene-1,3-styrene copolymer.

4. A process for preparing hard rubber articles comprising (1) mixing and maintaining without premature vulcanization a continuous solid phase composition containing a relatively high loading of powdered anthracite coal filler, sulphur in an amount of from about 10 to 40 parts by weight per 100 parts by weight of rubbery binder present, and from about 5 to 25 percent (solids) by weight of a latex of a rubbery binder based on the weight of the total composition, the amount of said latex being insufficient to prevent formation of a granular composition, (2) drying said composition in a stream of a heated gas to a maximum moisture content of about 2% by weight while agitating the same, the temperature of the composition being less than about 130° F. for at least three-fourths of the drying period and the composition being cooled when the temperature reaches about 200° F., (3) masticating an oily petroleum hydrocarbon plasticizer and an organic accelerator uniformly into said composition to form a curable, moldable mixture, and (4) molding and curing the same, said rubbery binder being essentially the only organic polymeric binder in said composition and being a vulcanizable rubbery butadiene-1,3-styrene copolymer.

5. A process for preparing hard rubber articles comprising (1) mixing and maintaining without premature vulcanization a continuous solid phase composition containing about 500 to 1000 parts by weight of a powdered anthracite coal filler, sulphur in an amount of from about 10 to 40 parts by weight per 100 parts by weight of rubbery binder present, and from about 5 to 25 percent (solids) by weight of a latex of a rubbery binder based on the weight of the total composition, the amount of said latex being insufficient to prevent formation of a granular composition, (2) drying said composition in a stream of a heated gas to a maximum moisture content of about 2% by weight while agitating the same, the temperature of the composition being less than about 130° F. for at least nine-tenths of the drying period and the composition being cooled when the temperature reaches about 200° F., (3) masticating an oily petroleum hydrocarbon plasticizer and an organic accelerator uniformly into said composition to form a curable moldable mixture and (4) molding and curing the same, said rubbery binder being essentially the only organic polymeric binder in said composition and being a vulcanizable butadiene-1,3-styrene copolymer.

6. A process for forming a composition useful in making rigid articles such as battery boxes and the like, which comprises gradually adding an aqueous dispersion of a rubbery binder to relatively dry solid compounding agents comprising a filler selected from the group consisting of china clay, talc, diatomaceous earth, anthracite coal, and semianthracite coal while said solid agents are agitated to expose new surfaces to contact with said aqueous dispersion, the amount of said aqueous dispersion being insufficient to prevent formation of a granular product and the rubbery binder content thereof being from about 5 to 25% of the weight of the solids content of the latex treated solids, drying the resulting mixture while subjecting it to agitation in a stream of a heated gas to a moisture content of less than 2%, the temperature of the mixture being less than about 130° F. during at least three-fourths of the drying period, removing the mixture from contact with the heated air promptly before the temperature of the mixture reaches about 250° F., thereafter masticating the dried mixture, and shaping the mixture by extrusion means without separation of the solid compounding ingredients from the rubbery binder, said rubbery binder being essentially the only organic polymeric binder in said mixture and being a vulcanizable butadiene-1,3-styrene copolymer.

7. A method for making compositions useful in forming hard rubber articles comprising the steps of preparing low rubber content compositions with highly accelerated curing properties by gradually adding from about 5 to 25% by dry weight based on the composition of an aqueous dispersion of a rubbery binder to solid compounding ingredients comprising a filler selected from the group consisting of china clay, talc, diatomaceous earth, anthracite coal and semianthracite coal while such ingredients are mixed and agitated, the amount of said aqueous dispersion being insufficient to prevent formation of a granular mixture, drying the mixture while agitating the mixture in a stream of heated air to a moisture content not above about 1%, maintaining the temperature of the mixture under about 130° F. during at least most of the drying period, and cooling the mixture immediately when the temperature of the mixture during drying goes over 130° F., and in no case permitting the temperature to go over 250° F., said rubbery binder being essentially the only organic polymeric binder in said mixture and being a vulcanizable butadiene-1,3-styrene copolymer having a raw Mooney viscosity of from about 40 to 60 (ML–4 at 212° F.).

8. The method which comprises dispersing a latex of a rubbery binder throughout substantially dry compounding ingredients including a filler selected from the group consisting of china clay, talc, diatomaceous earth, anthracite coal and semianthracite coal and a curing agent for said binder and agitating the resulting mixture while subjecting said mixture to a stream of a heated gas in an amount and at a temperature sufficient to reduce the moisture content of the resulting mixture to an amount not substantially greater than about 2% by weight and without scorching said rubbery binder, the temperature of the mixture during drying being less than about 130° F. for most of the drying period and the mixture being cooled when the temperature reaches about 200° F., said rubbery binder as solids being used in an amount of from about 5 to 25% by weight of the resulting mixture to provide an extrudable, compression moldable and curable granular mixture having a continuous phase of solid particles, and said rubbery binder being essentially the only organic polymeric binder in said mixture and being a vulcanizable rubber selected from the group consisting of (a) natural rubber, (b) rubbery homopolymers of conjugated dienes of the group consisting of butadiene, isoprene, dimethylbutadiene, cyanoprene and chloroprene, (c) copolymers of said conjugated dienes with a monomer selected from the group consisting of styrene, methyl methacrylate, acrylonitrile and isobutylene, and (d) reclaimed rubber.

9. A process for making compositions useful in forming rigid articles such as battery boxes and the like which comprises adding an aqueous dispersion of a rubbery binder to a relatively dry solid filler while said filler is agitated to expose new surfaces to contact with said aqueous dispersion, the amount of said aqueous dispersion being insufficient to prevent formation of a granular product and the rubbery binder content thereof being from about 5 to 25% of the weight of the solids content of the latex treated solids, drying the resulting mixture while subjecting it to agitation in a stream of heated gas to a moisture content of less than 2%, the temperature of the mixture being less than about 130° F. during at least most of the drying period and removing the mixture from contact with the heated air promptly before temperature of the mixture reaches about 250° F., said rubbery binder being essentially the only organic polymer binder in said mixture and being a vulcanizable elastomer.

References Cited
UNITED STATES PATENTS

| | | | |
|---|---|---|---|
| Re. 24,904 | 12/1960 | Dasher | 260—41.5 |
| 2,638,456 | 5/1953 | Laning | 260—41.5 |
| 2,935,763 | 5/1960 | Newman et al. | 260—41.5 |

MORRIS LIEBMAN, *Primary Examiner.*

J. H. DERRINGTON, *Assistant Examiner.*